(12) United States Patent
Liu et al.

(10) Patent No.: US 10,007,145 B2
(45) Date of Patent: Jun. 26, 2018

(54) BACKLIGHT FOR CURVED-SURFACE LIQUID CRYSTAL DISPLAY DEVICE AND CURVED-SURFACE LIQUID CRYSTAL DISPLAY DEVICE

(71) Applicant: Boe Technology Group Co., Ltd., Beijing (CN)

(72) Inventors: Qing Liu, Beijing (CN); Zhongbao Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 225 days.

(21) Appl. No.: 14/785,809

(22) PCT Filed: Mar. 6, 2015

(86) PCT No.: PCT/CN2015/073735
§ 371 (c)(1),
(2) Date: Oct. 20, 2015

(87) PCT Pub. No.: WO2016/070532
PCT Pub. Date: May 12, 2016

(65) Prior Publication Data
US 2016/0357066 A1   Dec. 8, 2016

(30) Foreign Application Priority Data
Nov. 7, 2014 (CN) .......................... 2014 1 0642471

(51) Int. Cl.
*G02F 1/1335* (2006.01)

(52) U.S. Cl.
CPC .. *G02F 1/133603* (2013.01); *G02F 1/133611* (2013.01); *G02F 1/133608* (2013.01)

(58) Field of Classification Search
CPC ........... F21Y 2105/18; G02F 1/133603; G02F 1/133608; G02F 1/133611
See application file for complete search history.

(56) References Cited

U.S. PATENT DOCUMENTS

2006/0203465 A1* 9/2006 Chang ............... G02F 1/133603
362/23.18
2007/0279937 A1* 12/2007 Hsiao ............... G02F 1/133603
362/613

(Continued)

FOREIGN PATENT DOCUMENTS

CN          103424913          12/2013
CN          103547109          1/2014

(Continued)

OTHER PUBLICATIONS

International Search Report and Written Opinion from PCT/CN2015/073735 dated Aug. 17, 2015.

(Continued)

*Primary Examiner* — Jong-Suk (James) Lee
*Assistant Examiner* — Zheng Song
(74) *Attorney, Agent, or Firm* — Calfee, Halter & Griswold LLP

(57) ABSTRACT

The present invention relates to a display device, and particularly to a backlight for a curved-surface liquid crystal display device and a curved-surface liquid crystal display device. The backlight comprises: a backplane which matches a curved-surface LCD display screen of the curved-surface liquid crystal display device; a supporting member which comprises a plurality of stepped surfaces parallel with a base plate of the backplane; and light sources which are arranged on each of the stepped surfaces, wherein the plurality of light sources form a curved surface projecting to one direction, and the projecting direction of the curved surface is the same as that of the curved-surface LCD display screen. Due to the stepped structure, the optical distribution of light sources along the curved surface is realized without bending mechanical structures and optical (Continued)

components of the backlight, and the fabrication difficulty of the backlight is reduced.

9 Claims, 3 Drawing Sheets

(56) References Cited

U.S. PATENT DOCUMENTS

| | | | | |
|---|---|---|---|---|
| 2009/0135599 | A1* | 5/2009 | Lin | F21K 9/00 362/249.02 |
| 2012/0299044 | A1* | 11/2012 | Mouri | G02F 1/133603 257/98 |
| 2013/0278865 | A1* | 10/2013 | He | G09F 13/04 349/64 |
| 2013/0321740 | A1* | 12/2013 | An | H05K 5/0217 349/58 |
| 2015/0029698 | A1* | 1/2015 | Huang | G02F 1/133603 362/97.1 |
| 2015/0219324 | A1* | 8/2015 | Kim | G02F 1/133305 349/58 |
| 2015/0285467 | A1* | 10/2015 | Choi | G09F 9/30 362/97.1 |
| 2015/0378212 | A1* | 12/2015 | Jia | G02F 1/133602 362/97.1 |
| 2016/0057850 | A1* | 2/2016 | Kang | G02F 1/133308 361/749 |

FOREIGN PATENT DOCUMENTS

| | | |
|---|---|---|
| CN | 103777382 | 5/2014 |
| CN | 203773876 | 8/2014 |
| CN | 204101849 | 1/2015 |
| JP | 2010-217702 | 9/2010 |

OTHER PUBLICATIONS

Office action from Chinese Application No. 201410642471.2 dated Aug. 9, 2016.

* cited by examiner

BACKLIGHT FOR CURVED-SURFACE LIQUID CRYSTAL DISPLAY DEVICE AND CURVED-SURFACE LIQUID CRYSTAL DISPLAY DEVICE

RELATED APPLICATIONS

The present application is the U.S. national phase entry of PCT/CN2015/073735, with an international filing date of Mar. 6, 2015, which claims the benefit of Chinese Patent Application No. 201410642471.2, filed Nov. 7, 2014, the entire disclosures of which are incorporated herein by reference.

FIELD OF THE INVENTION

The present invention relates to a display device, and particularly to a backlight for a curved-surface liquid crystal display device and a curved-surface liquid crystal display device.

BACKGROUND ART

Curved-surface LCD products emerge with development of the display technology and increasing requirement in terms of user experience. The LCD display panel is elastic, so that a curved-surface LCD display screen can be realized. Since liquid crystal does not emit light by itself, the curved-surface LCD display screen needs a backlight which provides a light distribution in a curved-surface profile. However, the bending process for mechanical structures and optical components of the backlight is difficult, and the curved optical components affect propagation of light, making it difficult to realize high uniformity in brightness.

The backlights for the curved-surface LCD in the prior art can be divided into a direct illumination type and a side illumination type. Both types of backlights require curved backplane mechanical structures and curved optical components, and thus face the problems of difficulty in processing.

SUMMARY

The present invention provides a backlight for a curved-surface liquid crystal display device and a curved-surface liquid crystal display device, which is used to improve uniformity of light from the backlight in the curved-surface liquid crystal display device and reduce fabrication difficulty of the backlight.

The present invention provides a backlight for a curved-surface liquid crystal display device which comprises:

a backplane which matches a curved-surface LCD display screen of the curved-surface liquid crystal display device;

a supporting member which is arranged in the backplane and comprises a plurality of stepped surfaces parallel with a base plate of the backplane; and light sources which are arranged on each of the stepped surfaces, wherein distances between the light sources on the plurality of stepped surfaces and the base plate of the backplane are different from each other, wherein the plurality of light sources form a curved profile projecting to one direction, and the projecting direction of the curved surface is the same as that of the curved-surface LCD display screen.

In the above technical solution, due to the stepped structure, the optical distribution of light sources along the curved surface is realized without bending mechanical structures and optical components of the backlight, and the fabrication difficulty of the backlight is reduced. Meanwhile, the light sources are horizontally arranged on the stepped surfaces in the same direction, so that the light sources have the same light exiting direction, enabling the backlight to provide more uniform light, which improves the display effect of the display device.

Preferably, in case the curved-surface LCD display screen is a convex LCD display screen, distances between the plurality of stepped surfaces and the base plate of the backplane decrease gradually in the direction from a central line to both sides of the curved-surface LCD display screen; and in case the curved-surface LCD display screen is a concave LCD display screen, distances between the plurality of stepped surfaces and the base plate of the backplane increase gradually in the direction from the central line to both sides of the curved-surface LCD display screen. As the stepped surfaces vary in height, the light sources form a curved-surface.

Preferably, the curved surface has the same curvature as the curved-surface LCD display screen. This further improves the uniformity of light.

Preferably, in case the curved-surface LCD display screen is a concave LCD display screen, the distance between the $n^{th}$ stepped surface which is counted in a direction from the edge of the backplane to the central line of the curved-surface LCD display screen and the base plate of the backplane meets the following equation:

$$\sqrt{\left(R2\tan^{-1}\frac{2y}{L-(n+1)p}\right)^2 - \left(\frac{L-(n+1)p}{2}\right)^2},$$

wherein, R is a curvature radius of the curved-surface LCD display screen, L is a length of the backplane in a direction perpendicular to the central line of the curved-surface LCD display screen, p is a horizontal distance between two neighboring light sources, y is an interval between a position on the curved-surface LCD display screen which corresponds to the light source on the $n^{th}$ stepped surface and the lowest point of the curved-surface LCD display screen. In this way, the arrangement of the stepped surfaces is defined.

Preferably, the supporting member comprises raised structures which correspond to each of the stepped surfaces. The stepped surfaces are supported by the raised structures.

Optionally, the plurality of raised structures are arranged by an interval.

Optionally, the plurality of raised structures are formed as an integral structure.

Preferably, the plurality of light sources are arranged in parallel.

Preferably, the light sources are LED lamps which are arranged as a single row in the lengthwise direction of the stepped surfaces. This makes it possible to provide light with enough brightness.

The present invention further provides a curved-surface liquid crystal display device, which comprises any one of the backlights as disclosed above.

In the above technical solution, due to the stepped structure, the optical distribution of light sources along the curved surface is realized without bending mechanical structures and optical components of the backlight, and the fabrication difficulty of the backlight is reduced. Meanwhile, the light sources are horizontally arranged on the stepped surfaces in the same direction, so that the light sources have the same light exiting direction, enabling the backlight to provide more uniform light, which improves the display effect of the display device.

Figure 1:
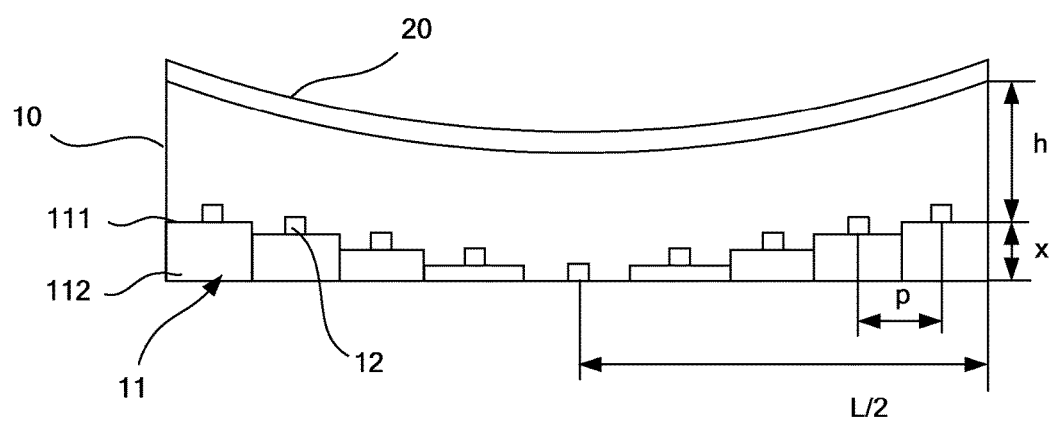
FIG. 1 is a cross-sectional view for illustrating a backlight for a curved-surface liquid crystal display device in an embodiment of the present invention.

REFERENCE NUMERALS 10 backplane, 11 supporting member, 111 stepped surface, 112 raised structures, 12 light source, 20 curved-surface LCD display screen.

DETAILED DESCRIPTION OF EMBODIMENTS

In order to improve uniformity of light emitted by a backlight in a curved-surface liquid crystal display device, and to reduce fabrication difficulty of the backlight, embodiments of the present invention provide a backlight for a curved-surface liquid crystal display device and a curved-surface liquid crystal display device. In technical solutions of the present invention, according to distances between light sources and the curved-surface LCD display screen, stepped structures of different heights are arranged on the backplane, and light sources are arranged on steps of different heights. As a result, the optical distribution of light sources along the curved profile is realized without bending mechanical structures and optical components of the backlight. Curved light sources are provided for the curved-surface LCD display screen. The fabrication difficulty of the backlight is reduced, and the uniformity in brightness of light is improved. The present invention will be further described hereinafter with reference to the following non-limiting embodiments, so that objects, technical solutions, and advantages of the present invention become clear.

Figure 3:
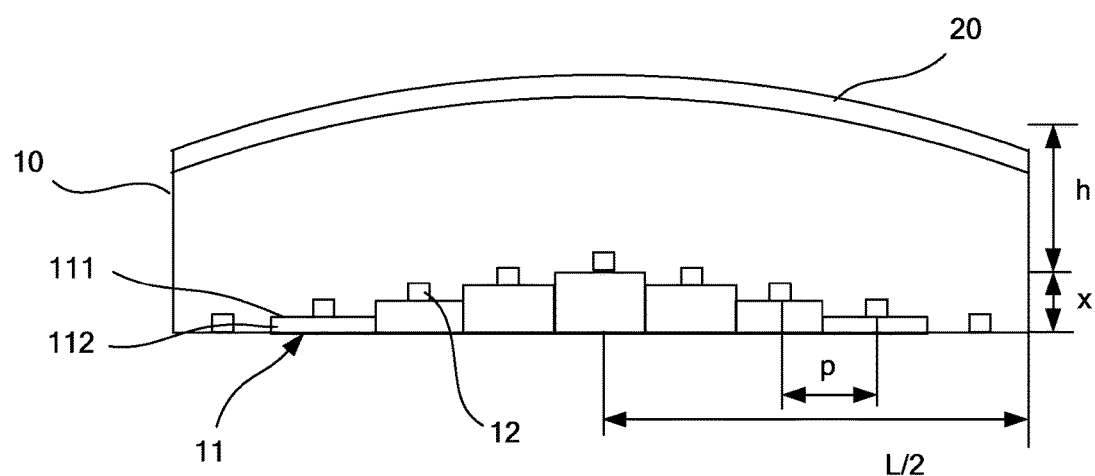
FIG. 3 is a cross-sectional view for illustrating another backlight for a curved-surface liquid crystal display device in an embodiment of the present invention.

Reference is made to FIG. 1 and FIG. 3, wherein FIG. 1 shows a cross-sectional view of a backlight in an embodiment of the present invention, and FIG. 3 shows a cross-sectional view of another backlight for a curved-surface liquid crystal display device in an embodiment of the present invention.

Embodiments of the present invention provide a backlight for a curved-surface liquid crystal display device. The backlight comprises:

a backplane which matches a curved-surface LCD display screen of the curved-surface liquid crystal display device;

a supporting member which is arranged in the backplane and comprises a plurality of stepped surfaces parallel with a base plate of the backplane; and light sources which are arranged on each of the stepped surfaces, distances between the light sources on the plurality of stepped surfaces and the base plate of the backplane are different from each other, wherein the plurality of light sources form a curved surface projecting to one direction, and the projecting direction of the curved surface is the same as that of the curved-surface LCD display screen.

In the above embodiments, the light sources are supported by stepped surface, and the light sources (once fixed) have different distances from the base plate. As a result, the plurality of light sources form a curved surface projecting to one direction, and the projecting direction of the curved surface is the same as that of the curved-surface LCD display screen, thus ensuring the light mixing distance between the light sources and the curved-surface LCD display screen. The effect of uniform light can be realized without bending the backlight and the light sources.

In particular, in case the curved-surface LCD display screen is a convex LCD display screen, distances between the plurality of stepped surfaces and the base plate of the backplane decrease gradually in a direction from a central line to both sides of the curved-surface LCD display screen; in case the curved-surface LCD display screen is a concave LCD display screen, distances between the plurality of stepped surfaces and the base plate of the backplane increase gradually in the direction from the central line to both sides of the curved-surface LCD display screen.

In the above embodiments, the supporting member 11 is arranged in the backplane 10, the supporting member 11 comprises the plurality of stepped surfaces 111, and distances between the stepped surfaces 111 and the base plate of the backplane 10 increase gradually or decrease gradually in the direction from the central line to both sides of the curved-surface LCD display screen. Thus, distances between the stepped surfaces 111 and the base plate vary along an arc-shaped profile of the curved-surface LCD display screen. The distances between the stepped surfaces 111 and the curved-surface LCD display screen 20 are ensured, and the distances between the light sources 12 on the stepped surfaces 111 and the curved-surface LCD display screen 20 are thus ensured. Due to the stepped structure, the optical distribution of light sources 12 along the curved surface is realized without bending mechanical structures and optical components of the backlight, and the fabrication difficulty of the backlight is reduced. In addition, by adopting such a structure, the light sources 12 are horizontally arranged on the stepped surfaces 111 (the arrangement direction of the backlight in FIG. 1 is referred to as a horizontal direction), and the light sources 12 are arranged in the same direction, so that the light sources have the same light exiting direction. The problem that the light is concentrated and non-uniform due to the arc-shaped arrangement of light sources 12 and different arrangement directions of light sources (towards a curving center of the arc) can be solved, thus enabling the backlight to provide more uniform light and improving the display effect of the display device.

The backlight in an embodiment of the present invention will be described in details by taking a backlight in a concave curved-surface LCD display screen as an example and by referring to FIG. 1 and FIG. 2, in order to facilitate understanding the backlight of the present embodiment.

To further improve uniformity of light from the backlight, it is preferred that the curved surface formed by the light sources 12 has the same curvature as that of the curved-surface LCD display screen 20. It is ensured distances between the light sources 12 and the curved-surface LCD display screen 20 are constant, so that brightness of light incident on the curved-surface LCD display screen 20 from the light sources 12 are constant, and the uniformity of light emitted by the backlight is improved.

In a specific case, there are restrictions to distances between the stepped surfaces 111 and the base plate of the backplane 10. These restrictions are defined as follow. The distance between the $n^{th}$ stepped surface 111 (which is counted in a direction from the edge of the backplane 10 to the central line of the curved-surface LCD display screen 20) and the base plate of the backplane 10 meets the following equation:

$$\sqrt{\left(R2\tan^{-1}\frac{2y}{L-(n+1)p}\right)^2 - \left(\frac{L-(n+1)p}{2}\right)^2},$$

wherein, L is a length of the backplane 10 in a direction perpendicular to the central line of the curved-surface LCD display screen 20; p is a horizontal distance between two neighboring light sources 12 (the horizontal distance refers to the distance between two light sources 12 by taking the arrangement direction of the backlight shown in FIG. 1 as the reference direction); y is an interval between a position on the curved-surface LCD display screen 20 which corresponds to the light source 12 on the $n^{th}$ stepped surface 111 and the lowest point of the curved-surface LCD display screen 20.

In particular, as shown in FIG. 1, the light sources 12 are arranged on the stepped surfaces 111. It is assumed that the backplane 10 has a length of L in a direction perpendicular to the central line of the curved-surface LCD display screen 20 (i.e., the direction for arranging the steps), and the horizontal distance between two neighboring light sources 12 is p. In a design, the distance between the light source 12 at the edge and the side of the backplane 10 is p/2.

Figure 2:
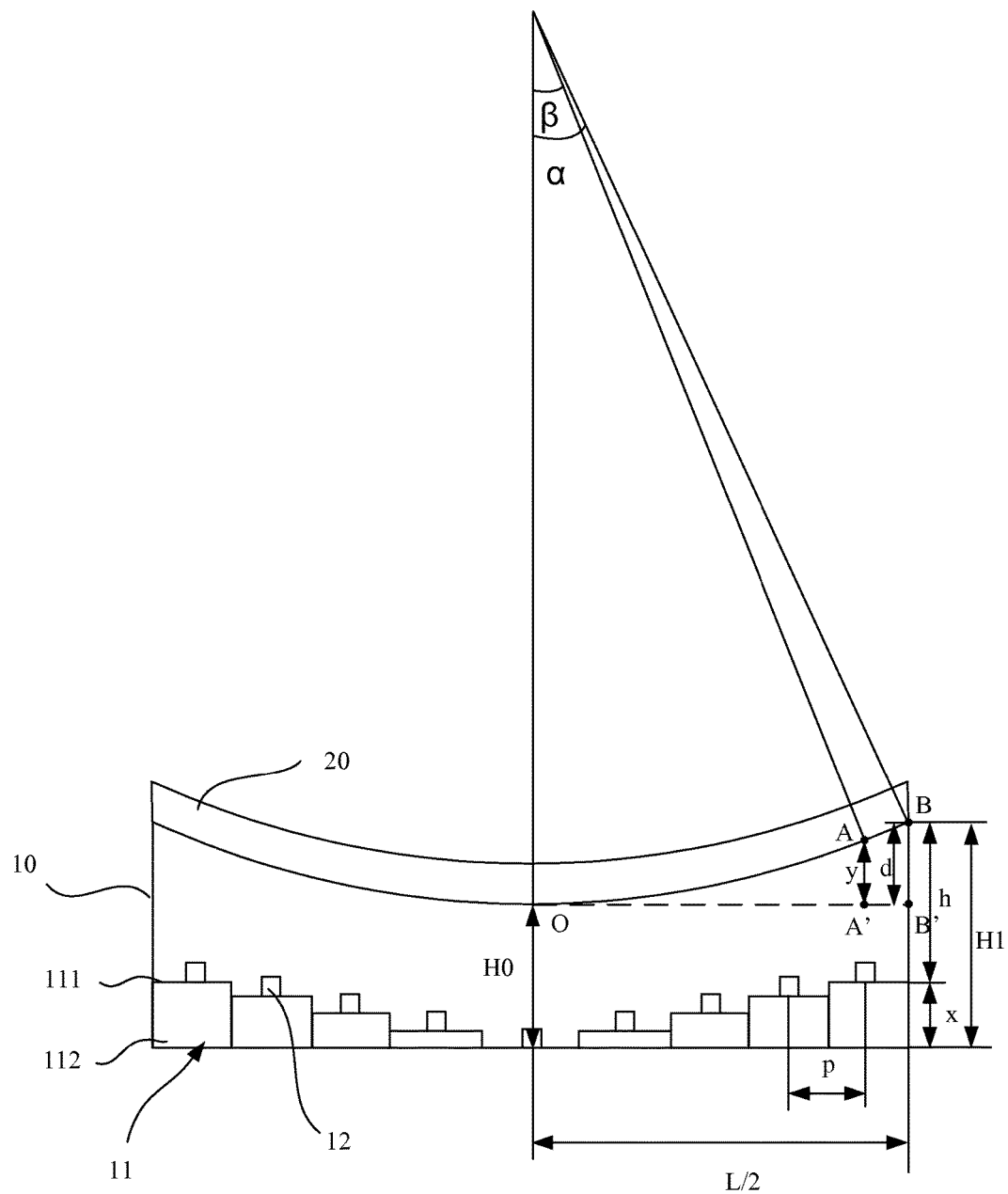
FIG. 2 is a schematic view for illustrating the arrangement of stepped surfaces in a backlight for a curved-surface liquid crystal display device in an embodiment of the present invention.

As shown in FIG. 2, in the backlight of the curved-surface display device, the height of the stepped surface 111 corresponding to each light source 12 is calculated as follow. O is the lowest point of the curved-surface LCD display screen 20, B is an edge point of the curved-surface LCD display screen 20, A is a position on the curved-surface LCD display screen 20 to which the very edge light source 12 corresponds, x is a step height (i.e., a distance between each stepped surface 111 and the base plate of the backplane 10). In case the curved-surface LCD display screen 20 is modified to the point B to form a curved-surface display, and it is assumed that the edge of the curved-surface LCD display screen 20 is modified by a size of d (i.e., a vertical distance between points B and O). As for the light source 12 at the edge, the distance between the backplane 10 of this light source 12 and the curved-surface LCD display screen 20 is increased by y (i.e., a vertical distance between points A and O). The light source 12 at the center of the backlight has a light mixing distance of h (the light source 12 is deemed as a point light source the volume of which is not considered, and h refers to a distance between the stepped surface and a corresponding position on the curved-surface LCD display screen in a direction perpendicular to a bottom surface of the backplane), and the distance H0 between the backplane 10 of this light source 12 and the curved-surface LCD display screen 20 equals to the light mixing distance, i.e., $$H0 = h \tag{1}.$$

Assuming the curved-surface LCD display screen 20 has a curvature radius of R, OB has a length of Rα, wherein α is an included angle between lines for connecting points O and B and the curvature center of the curved-surface LCD display screen 20, i.e., a central angle corresponding to the arc OB. In a right-angled triangle ΔOBB' of FIG. 2 (point B' is a projection of point B on a horizontal line passing point O, i.e., ∠BB'O is a right angle), ∠BOB'=α/2. According to the tangent equation, $$\frac{\alpha}{2} = \tan^{-1}\frac{2d}{L}. \tag{2}$$

In addition, in the right-angled triangle ΔOBB', according to the Pythagorean theorem, $$d^2 + (L/2)^2 = (R\alpha)^2 \tag{3}.$$

A curvature radius in this case is obtained from equations (2) and (3):

$$R = \frac{\sqrt{d^2 + (L/2)^2}}{2\tan^{-1}\frac{2d}{L}}. \tag{4}$$

In FIG. 2, OA has a length of Rβ. Similarly, in a right-angled triangle ΔOAA' (point A' is a projection of point A on the horizontal line passing point O, i.e., ∠AA'O is a right angle), ∠AOA'=β/2. According to the tangent equation, $$\frac{\beta}{2} = \tan^{-1}\frac{y}{L/2 - p/2}, \tag{5}$$

$$\text{i.e., } \beta = 2\tan^{-1}\frac{2y}{L-p}. \tag{6}$$

In addition, in the right-angled triangle ΔOAA', according to the Pythagorean theorem:

$$y^2 + \left(\frac{L}{2} - \frac{p}{2}\right)^2 = (R\beta)^2, \tag{7}$$

i.e., \tag{8}

$$y = \sqrt{(R\beta)^2 - \left(\frac{L-p}{2}\right)^2} = \sqrt{\left(2R\tan^{-1}\frac{2y}{L-p}\right)^2 - \left(\frac{L-p}{2}\right)^2}.$$

Therefore, the distance between the position of the base plate on which the first column of light sources 12 are arranged and the curved-surface LCD display screen 20 is changed to, $$H1 = H0 + y \tag{9}.$$

By substituting the equations (1) and (8) into the equation (9), $$H1 = h + \sqrt{\left(2R\tan^{-1}\frac{2y}{L-p}\right)^2 - \left(\frac{L-p}{2}\right)^2}. \tag{10}$$

Meanwhile, the distance between the position of the base plate on which the first column of light sources 12 are arranged and the curved-surface LCD display screen 20 equals to the sum of the light mixing distance h and the step height x, i.e., $$H1 = h + x = h + \sqrt{\left(2R\tan^{-1}\frac{2y}{L-p}\right)^2 - \left(\frac{L-p}{2}\right)^2}. \tag{11}$$

Namely, the first column step has a height x, $$x = \sqrt{\left(2R\tan^{-1}\frac{2y}{L-p}\right)^2 - \left(\frac{L-p}{2}\right)^2}. \quad (12)$$

Based on the above calculations, the distance between the stepped surface 111 on which each light source 12 is arranged and the base plate is expressed by:

$$\sqrt{\left(R2\tan^{-1}\frac{2y}{L-(n+1)p}\right)^2 - \left(\frac{L-(n+1)p}{2}\right)^2}. \quad (13)$$

The present invention is applicable to 46-110-inch TV, e.g., 46, 55, 65, 85, 98, 110-inch TV. A 65-inch TV is taken as an example, and light sources 12 are arranged in parallel. Each light source 12 is a plurality of LED lamps which are arranged as a single row in the lengthwise direction of the stepped surfaces 111, so that light with enough brightness is provided. The specific implementations are described as follow.

(1) A 65inch backlight has a size of L 1428 mm * W 804 mm. The direction in which the steps are arranged is along the long side, i.e., the steps are arranged along the side with a length of 1428 mm. It is assumed that the horizontal distance between LEDs in the backlight is p=25 mm, then in a design, the distance between the LED at the edge LED and the side of the backlight is 11.5 mm, and LEDs are arranged in a 57*32 array in the backlight. It is assumed that the backlight has a light mixing distance of h=90 mm, and that all LEDs in each column of LEDs in the backlight have a light mixing distance of h, the distance between the central column of LEDs and the curved-surface LCD display screen 20 is H0=90 mm. It is assumed that the step has a height of x.

(2) In case an edge of the curved-surface LCD display screen 20 is modified by d=40 mm, the corresponding curved-surface LCD display screen 20 has a curvature radius of R=6000 mm. Thus, according to calculations based on the Pythagorean theorem, the distance between the backplane 10 of a marginal column of LEDs and the curved-surface LCD display screen 20 is increased by y=20.5 mm, and the distance between the backplane 10 of the marginal column of LEDs and the curved-surface LCD display screen 20 is H0+y=110.5 mm. Meanwhile, the distance between the backplane 10 of the marginal column of LEDs and the curved-surface LCD display screen 20 equals to the sum of the light mixing distance h and the step height x. Namely, the marginal column has a step height of x=20.5 mm.

(3) The step height for each column of LEDs is calculated as:

$$\sqrt{\left(2\times 6000 \times \tan^{-1}\frac{2\times 20.5}{1428-(n+1)\times 25}\right)^2 - \left(\frac{1428-(n+1)\times 25}{2}\right)^2}. \quad (14)$$

wherein n refers to the $n^{th}$ column of LEDs counted from the edge of the backlight. In the present embodiment, n=1, 2, 3, ... 28, 29, 30. LEDs at both sides of the central column are symmetric with respect to the central column. Namely, the third column counted from the edge of the backlight has the same step height as the $28^{th}$ column.

The supporting member 11 comprises raised structures 112 corresponding to the stepped surfaces 111. Namely, the supporting member 11 is a plurality of raised structures 112, and the upper surface of the raised structures 112 is the stepped surfaces 111. The light sources 12 are supported by the raised structures 112. In practice, the plurality of raised structures 112 can be arranged by an interval. Alternatively, the plurality of raised structures 112 can be formed as an integral structure. The producer can adopt different structures according to actual production situation.

It is understood that the backlight of the present invention is not limited to a concave backlight for a curved-surface liquid crystal display device as shown in FIG. 1 and FIG. 2. The backlight can also be a convex backlight for a curved-surface liquid crystal display device as shown in FIG. 3. These two backlights have similar principles and the difference only lies as follow. Since the bending direction of the curved-surface LCD display screen 20 in the convex curved-surface liquid crystal display device is different from that of the concave curved-surface LCD display screen 20, the stepped surfaces 111 in the backplane 10 are arranged in different manner. In case the curved-surface LCD display screen 20 is a convex LCD display screen, distances between the plurality of stepped surfaces 111 and the base plate of the backplane 10 decrease gradually in a direction from the central line to both sides of the curved-surface LCD display screen 20. Thus, the light sources 12 are arranged in a manner that follows the profile of the curved-surface, and the uniformity of light is ensured.

Embodiments of the present invention further provides a curved-surface liquid crystal display device which comprises any one of the backlight as disclosed above.

In the above embodiments, the supporting member 11 is arranged in the backplane 10, the supporting member 11 comprises the plurality of stepped surfaces 111, and distances between the stepped surfaces 111 and the base plate of the backplane 10 increase gradually or decrease gradually in the direction from the central line to both sides of the curved-surface LCD display screen. Thus, distances between the stepped surfaces 111 and the base plate vary along an arc-shaped profile of the curved-surface LCD display screen. The distances between the stepped surfaces 111 and the curved-surface LCD display screen 20 are ensured, and the distances between the light sources 12 on the stepped surfaces 111 and the curved-surface LCD display screen 20 are thus ensured. Due to the stepped structure, the optical distribution of light sources 12 along the curved surface is realized without bending mechanical structures and optical components of the backlight, and the fabrication difficulty of the backlight is reduced. In addition, by adopting such a structure, the light sources 12 are horizontally arranged on the stepped surfaces 111 (the arrangement direction of the backlight in FIG. 1 is referred to as a horizontal direction), and the light sources 12 are arranged in the same direction, so that the light sources have the same light exiting direction. The problem that the light is concentrated and non-uniform due to the arc-shaped arrangement of light sources 12 and different arrangement directions of light sources (towards a curving center of the arc) can be solved, thus enabling the backlight to provide more uniform light and improving the display effect of the display device.

Although the present invention has been described above with reference to specific embodiments, it should be understood that the limitations of the described embodiments are merely for illustrative purpose and by no means limiting. Instead, the scope of the invention is defined by the appended claims rather than by the description, and all variations that fall within the range of the claims are intended to be embraced therein. Thus, other embodiments than the specific ones described above are equally possible within the scope of these appended claims.

The invention claimed is:

1. A backlight for a curved-surface liquid crystal display device, comprising:
   a backplane which has a base plate with a flat surface and matches a curved-surface LCD display screen of the curved-surface liquid crystal display device;
   a supporting member which is arranged on the flat surface of the base plate and comprises a plurality of stepped surfaces parallel with the flat surface of the base plate; and
   a plurality of light sources which are arranged on each of the stepped surfaces, wherein distances between the light sources on the plurality of stepped surfaces and the base plate of the backplane are different from each other,
   wherein the plurality of light sources form a curved surface profile projecting to one direction, and the projecting direction of the curved profile is the same as that of the curved-surface LCD display screen,
   wherein the curved-surface LCD display screen is a concave LCD display screen, distances between the plurality of stepped surfaces and the base plate of the backplane increase gradually in the direction from the central line to both sides of the curved-surface LCD display screen, and the distance between an $n^{th}$ stepped surface which is counted in a direction from an edge of the backplane to the central line of the curved-surface LCD display screen and the base plate of the backplane meets the following equation:

$$\sqrt{\left(R2\tan^{-1}\frac{2y}{L-(n+1)p}\right)^2 - \left(\frac{L-(n+1)p}{2}\right)^2}$$

wherein, R is a curvature radius of the curved-surface LCD display screen, L is a length of the backplane in a direction perpendicular to the central line of the curved-surface LCD display screen, p is a horizontal distance between two neighboring light sources, and y is an interval between a position on the curved-surface LCD display screen which corresponds to the light source on the $n^{th}$ stepped surface and the lowest point of the curved-surface LCD display screen.

2. The backlight of claim 1, wherein the curved profile has the same curvature as the curved-surface LCD display screen.

3. The backlight of claim 2, wherein the plurality of light sources are arranged in parallel.

4. The backlight of claim 1, wherein the supporting member comprises a plurality of raised structures, and upper surfaces of the raised structures are the stepped surfaces.

5. The backlight of claim 4, wherein the plurality of raised structures are arranged by an interval.

6. The backlight of claim 4, wherein the plurality of raised structures are formed as an integral structure.

7. The backlight of claim 1, wherein the plurality of light sources are arranged in parallel.

8. The backlight of claim 7, wherein the light sources are LED lamps which are arranged as a single row in the lengthwise direction of the stepped surfaces.

9. A curved-surface liquid crystal display device, comprising the backlight of claim 1.

* * * * *